(12) United States Patent
Decrop et al.

(10) Patent No.: US 11,687,221 B2
(45) Date of Patent: Jun. 27, 2023

(54) AUGMENTED REALITY BASED USER INTERFACE CONFIGURATION OF MOBILE AND WEARABLE COMPUTING DEVICES

(71) Applicant: INTERNATIONAL BUSINESS MACHINES CORPORATION, Armonk, NY (US)

(72) Inventors: Clement Decrop, Arlington, VA (US); Sarbajit K. Rakshit, Kolkata (IN); Martin G. Keen, Cary, NC (US); John M. Ganci, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/458,614

(22) Filed: Aug. 27, 2021

(65) Prior Publication Data

US 2023/0062700 A1   Mar. 2, 2023

(51) Int. Cl.
*G06F 3/04845* (2022.01)
*G06F 3/0486* (2013.01)
*G06T 7/11* (2017.01)

(52) U.S. Cl.
CPC ........ *G06F 3/04845* (2013.01); *G06F 3/0486* (2013.01); *G06T 7/11* (2017.01)

(58) Field of Classification Search
CPC ....... G06F 3/04845; G06F 3/0486; G06T 7/11
See application file for complete search history.

(56) References Cited

U.S. PATENT DOCUMENTS

| 11,023,035 | B1* | 6/2021 | Atlas | ...................... G06F 3/014 |
| 2011/0221672 | A1 | 9/2011 | Osterhout | |
| 2012/0200499 | A1 | 8/2012 | Osterhout | |
| 2014/0168056 | A1 | 6/2014 | Swaminathan | |
| 2014/0325053 | A1 | 10/2014 | Hewitt | |
| 2015/0309316 | A1 | 10/2015 | Osterhout | |
| 2016/0034039 | A1* | 2/2016 | Maeda | ................ G06F 3/04842 |
| | | | | 715/810 |

(Continued)

FOREIGN PATENT DOCUMENTS

WO    2018090060 A1    5/2018

OTHER PUBLICATIONS

IBM Cloud, "Build smarter mobile services and apps," IBM, [accessed on Jul. 8, 2021], 5 pages, Retrieved from the Internet: <URL: https://www.ibm.com/cloud/mobile>.

(Continued)

*Primary Examiner* — Premal R Patel

(74) *Attorney, Agent, or Firm* — Anthony M. Pallone

(57) ABSTRACT

According to one embodiment, a method, computer system, and computer program product for computing device control. The embodiment may include segmenting an augmented reality (AR) view of an environment of a user into distinct segmented areas of the AR view. The AR view is created by an AR device of the user. The segmenting is performed using the AR device. The embodiment may include mapping a computing device within the environment to a distinct segmented area of the AR view. The mapping results in a user interface (UI) of the computing device being displayed within the distinct segmented area of the AR view. The embodiment may include controlling the computing device via the UI of the computing device displayed within the distinct segmented area of the AR view.

17 Claims, 5 Drawing Sheets

(56) References Cited

U.S. PATENT DOCUMENTS

| | | | |
|---|---|---|---|
| 2016/0054791 A1 | 2/2016 | Mullins | |
| 2017/0061700 A1* | 3/2017 | Urbach | |
| 2018/0158250 A1* | 6/2018 | Yamamoto | G06T 19/20 |
| 2019/0146219 A1 | 5/2019 | Rodriguez, II | |
| 2019/0349575 A1* | 11/2019 | Knepper | G06F 3/013 |
| 2019/0385375 A1* | 12/2019 | Park | G06F 1/1698 |
| 2020/0137175 A1 | 4/2020 | Ganci, Jr. | |
| 2022/0004639 A1* | 1/2022 | Yardi | G06F 9/4401 |

OTHER PUBLICATIONS

IBM iX, "Mobile experiences for everyone," IBM, [accessed on Jul. 8, 2021], 5 pages, Retrieved from the Internet: <URL: https://www.ibm.com/services/ibmix/mobile/>.

IBM Watson, "IBM Watson products," IBM, [accessed on Jul. 8, 2021], 18 pages, Retrieved from the Internet: <URL: https://www.ibm.com/watson/products-services>.

Zhu et al., "BISHARE: Exploring Bidirectional Interactions Between Smartphones and Head-Mounted Augmented Reality," CHI '20: Proceedings of the 2020 CHI Conference on Human Factors in Computing Systems [conference paper], Apr. 2020, 14 pages, ACM Digital Library, Retrieved from the Internet: <URL: https://dl.acm.org/doi/10.1145/3313831.3376233>.

Mell et al., "The NIST Definition of Cloud Computing", National Institute of Standards and Technology, Special Publication 800-145, Sep. 2011, 7 pages.

\* cited by examiner

AUGMENTED REALITY BASED USER INTERFACE CONFIGURATION OF MOBILE AND WEARABLE COMPUTING DEVICES

BACKGROUND

The present invention relates generally to the field of computing, and more particularly to augmented reality and smart device control applications.

Augmented reality (AR) is an interactive experience or a real-world environment where objects that reside in the real world are enhanced by computer generated perceptual information across one or more sensory modalities (e.g., visual, auditory, haptic, somatosensory, olfactory). AR may be defined as a system that incorporates three basic features: a combination of real and virtual worlds, real-time interaction, and accurate 3D registration of virtual and real objects. The overlaid sensory information may be constructive (i.e., additive to the real-world environment), or destructive (i.e., masking of the real-world environment). AR may be used to enhance natural environments or situations and offer perceptually enriched experiences. With the help of advanced AR technologies (e.g., adding computer vision, incorporating AR technology into smart device applications) information about the surrounding real world of a user becomes interactive and digitally manipulated. AR techniques are typically performed in real-time and are context aware (i.e., considering situational contexts of users or devices). Hardware components for augmented reality may include a processor, a display, sensors, and input devices. For example, AR displays may be rendered on computing devices resembling eyeglasses that employs cameras to intercept the real-world view and re-display its augmented view through the eyepieces.

A smart device is an electronic device that may connect, share, and interact with its user and other smart devices. Smart devices generally connect to other devices or networks via different wireless protocols (e.g., Bluetooth, Zigbee, Near-Field Communication (NFC), Wi-Fi, and cellular networks) and may operate to some extent interactively and autonomously. Some examples of commonly used smart devices include smartphones, smartwatches, tablets, smart thermostats, and smart TVs. Smart devices play a fundamental role in today's commercial electronic industry and are at the center of the Internet-of-Things (IoT).

SUMMARY

According to one embodiment, a method, computer system, and computer program product for computing device control. The embodiment may include segmenting an augmented reality (AR) view of an environment of a user into distinct segmented areas of the AR view. The AR view is created by an AR device of the user. The segmenting is performed using the AR device. The embodiment may include mapping a computing device within the environment to a distinct segmented area of the AR view. The mapping results in a user interface (UI) of the computing device being displayed within the distinct segmented area of the AR view. The embodiment may include controlling the computing device via the UI of the computing device displayed within the distinct segmented area of the AR view.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
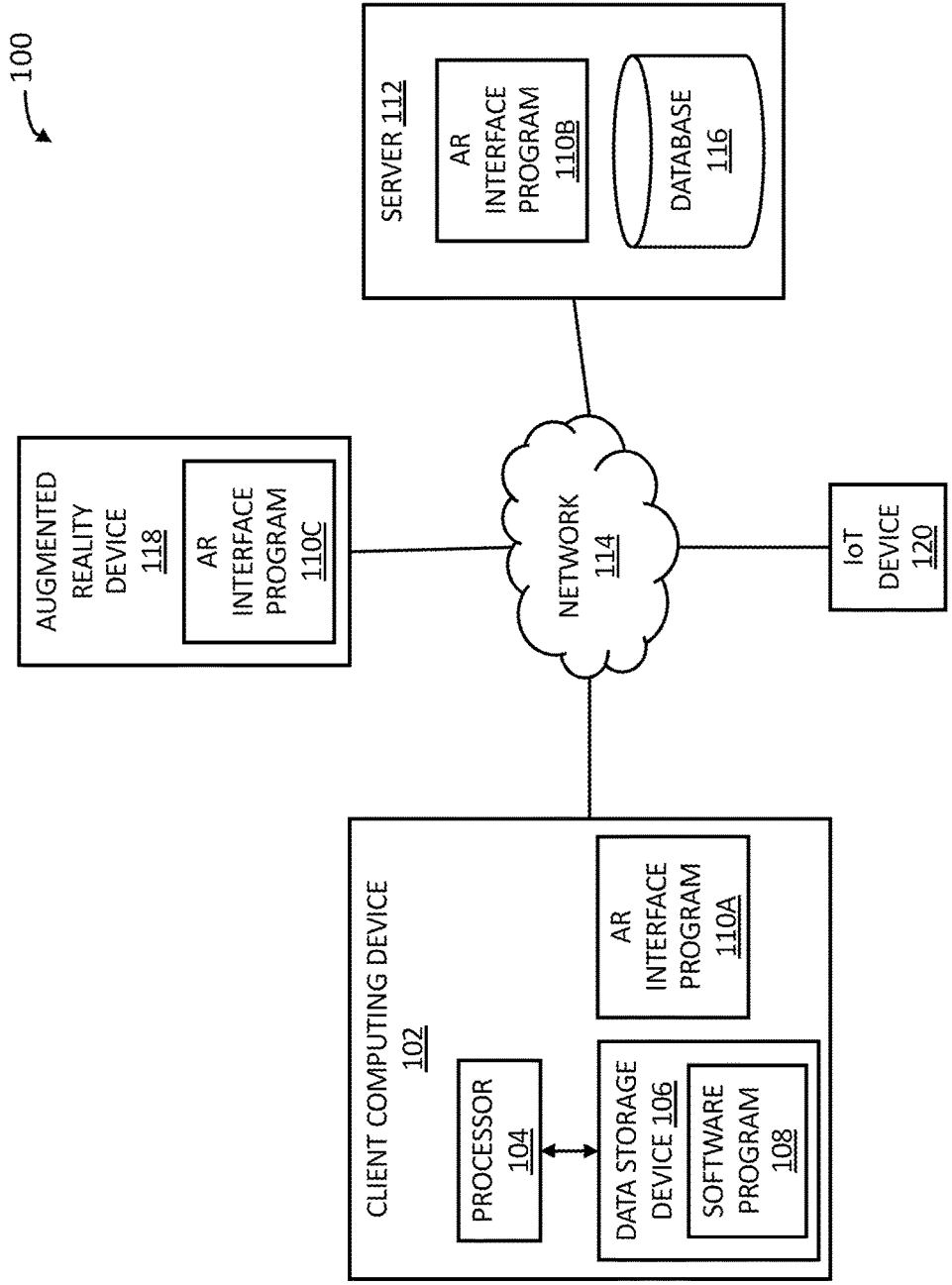
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to augmented reality and smart device control applications. The following described exemplary embodiments provide a system, method, and program product to, among other things, visually segment a surrounding environment within an AR view and, accordingly, map user interfaces of smart devices within the environment to segments of the AR view. Therefore, the present embodiment has the capacity to improve the technical fields of augmented reality and smart device control applications by providing the user with the ability to control functionality of multiple smart devices from within a centralized AR view, thus improving user accessibility among the multiple smart devices.

As previously described, augmented reality is an interactive experience or a real-world environment where objects that reside in the real world are enhanced by computer generated perceptual information across one or more sensory modalities (e.g., visual, auditory, haptic, somatosensory, olfactory). AR may be defined as a system that incorporates three basic features: a combination of real and virtual worlds, real-time interaction, and accurate 3D registration of virtual and real objects. The overlaid sensory information may be constructive (i.e., additive to the real-world environment), or destructive (i.e., masking of the real-world environment). AR may be used to enhance natural environments or situations and offer perceptually enriched experiences. With the help of advanced AR technologies (e.g., adding computer vision, incorporating AR technology into smart device applications) information about the surrounding real world of a user becomes interactive and digitally manipulated. AR techniques are typically performed in real-time and are context aware (i.e., taking into account situational contexts of users or devices). Hardware components for augmented reality may include a processor, a display, sensors, and input devices. For example, AR displays may be rendered on computing devices resembling eyeglasses that employs cameras to intercept the real-world view and re-display its augmented view through the eyepieces.

A smart device is an electronic device that may connect, share, and interact with its user and other smart devices. Smart devices generally connect to other devices or networks via different wireless protocols (e.g., Bluetooth, Zigbee, Near-Field Communication (NFC), Wi-Fi, and cellular networks) and may operate to some extent interactively and autonomously. Some examples of commonly used smart devices include smartphones, smartwatches, tablets, smart thermostats, and smart TVs. Smart devices play a fundamental role in today's commercial electronic industry and are at the center of the IoT. Indeed, IoT devices such as mobile computing devices and wearable computing devices have grown in popularity for use within home and business environments. The rise in popularity of such devices presents many scenarios in which users may attempt to interact with multiple devices simultaneously such as smartwatch and smartphone apps, weather, biometric data visualization, etc. However, such multi-device usage attempts by a user may prove challenging for the user's interaction and view across the multiple devices.

For example, in a scenario where one or more of the IoT devices are wearable (e.g., a smartwatch worn on wrist) or hand-held (e.g., a smartphone held in hand), selection, by the user, of app controls (e.g., UI controls) for manipulating/configuring the devices may be cumbersome as performing the control interaction typically requires a free hand to interact with the app menus of the devices. Further, if the user wants to view multiple contents within the screens of the devices, say a smartwatch and a smartphone, the user may be challenged when viewing respective screens of the devices if the smartwatch is worn on the wrist of the hand in which the user is holding the smartphone. Such interaction and viewing challenges may be increased as the user attempts to interact with and view more devices. Additionally, for users having physical accessibility needs (e.g., arm or hand limitations), multi-device interaction and viewing challenges may be further compounded. It may therefore be imperative to have a system in place to provide a centralized AR view through which a user may visualize and interact with UIs of multiple IoT devices. Thus, embodiments of the present invention may be advantageous to, among other things, provide for user control of multiple IoT device functionality from within an AR view, provide a shared display within the AR view of interactive application contents (e.g., UIs) of the multiple IoT devices controlled via the AR view, change/configure displayed application content within the AR view of a controlled IoT device based on its position relative to other controlled devices or a user, learn mobility patterns of user interaction with IoT devices, and enhance user accessibility when interacting with multiple IoT devices. The present invention does not require that all advantages need to be incorporated into every embodiment of the invention.

According to at least one embodiment, a user may utilize AR glasses to visually segment their surrounding environment into multiple segmented areas within an AR view of the surrounding environment. IoT devices present within the surrounding environment, which are paired to the AR glasses and represented by rendered objects within the AR view, may be mapped (e.g., dragged and dropped) to distinct segmented areas of the AR view and a UI for each mapped IoT device may be displayed within its respective segmented area within the AR view. The user may utilize the AR glasses to navigate among and within the displayed UIs and to control a mapped IoT device via interaction with its UI within the AR view.

According to at least one embodiment, the distinct segmented areas of the AR view may be defined via user physical touch input on the frame of the AR glasses (e.g., user manipulation of controls mounted on the frame of the AR glasses) as they visually scan the surrounding environment. According to at least one other embodiment, the distinct segmented areas of the AR view may be dynamically defined based on eye or head movement of the user detected by the AR glasses as the user visually scans the surrounding environment. The distinct segmented areas of the AR view may also be dynamically defined based on hand gestures of the user such as dragging and dropping (i.e., mapping) a rendered object representative of a paired IoT device to a particular region/location within the AR view. According to at least one further embodiment, the distinct segmented areas of the AR view may be defined based on pre-defined segmentation preferences of a location or user specific profile.

According to at least one embodiment, the mapping, layout, and/or content (e.g., available functions) of a displayed UI for a mapped IoT device within the AR view may be changed in response to a change in position or orientation of the mapped IoT device relative to the user or to other mapped IoT devices. The change in position or orientation of the mapped IoT device may be a control action input to the AR glasses. According to at least one other embodiment, the mapping, layout, and/or content of a displayed UI for a mapped IoT device within the AR view may be changed in response to physical touch input of the user to the AR glasses (e.g., the user performing control actions via controls mounted on the frame of the AR glasses).

According to at least one further embodiment, the mapping, layout, and/or content of a displayed UI for a mapped IoT device within the AR view may be changed in response to user input (e.g., control actions) captured by the AR glasses such as hand gestures of the user (e.g., wrist movements, drag and drop of rendered objects within AR view) or physical mobility, by the user, of the mapped IoT device (i.e., movement of the mapped IoT device during user interaction with the mapped IoT device). Hand gestures of the user and patterns of physical mobility for the mapped IoT device may be learned and used to predict/recommend a mapping or configuration of the UI for the mapped IoT device displayed within the AR view. Additionally, while performing a hand gesture or physical mobility of the mapped IoT device, a thumbnail for navigation direction guidance may be displayed within the AR view of the AR glasses or overlayed on a screen of the mapped IoT device. Moreover, based on available configurations (e.g., portrait/landscape configurations) of the UI for the mapped IoT device, the thumbnail may depict a preview of changed mapping or configuration of the UI within the AR view resulting from continued performance of the hand gesture or physical mobility of the mapped IoT device. Information conveyed by the thumbnail may allow the user to quickly change the physical mobility or relative position of the mapped IoT device in order to attain display of the previewed UI mapping or configuration within the AR view.

According to at least one embodiment, information relating to user interactions with paired IoT devices and AR glasses (e.g., physical mobility, usage, location, hand gestures), information relating to user actions within the AR view (e.g., segmentation and mapping actions/preferences in different contextual settings), and information of paired IoT devices (e.g., mapping histories, usage frequencies) may be gathered for historical analysis. Artificial intelligence (AI) enabled methods of historical analysis (e.g., machine learning) may be applied to the gathered information to learn/derive patterns of physical mobility for paired IoT devices, patterns of paired IoT device usage in different contextual settings (e.g., patterns of paired IoT device usage in home and work locations), mapping histories of paired IoT devices, mapping histories of most interacted with paired IoT devices, commonly implemented segmentation schemes for different contextual settings, heat maps indicative of concentrations of paired IoT device user interactions (e.g., a heat map showing a user's most and least interacted with paired IoT devices), and heat maps indicative of frequencies of segmented area mappings to paired IoT devices (e.g., a heat map showing most and least mapped to segmented areas). The information learned/derived through historical analysis may be used to determine and/or recommend UI mappings, for paired IoT devices, within the AR view. Furthermore, the information learned/derived through historical analysis may be stored within location or user specific profiles stored within a database.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to visually segment a surrounding environment within an AR view and, accordingly, map user interfaces of smart devices within the environment to segments of the AR view.

Referring to FIG. 1, an exemplary networked computer environment 100 is depicted, according to at least one embodiment. The networked computer environment 100 may include client computing device 102, a server 112, augmented reality device 118, and IoT device 120 interconnected via a communication network 114. According to at least one implementation, the networked computer environment 100 may include a plurality of client computing devices 102, servers 112, and IoT devices 120, of which only one of each is shown for illustrative brevity. Additionally, in one or more embodiments, the client computing device 102, the server 112, and the augmented reality device 118 may each host an augmented reality (AR) interface program 110A, 110B, 110C. In one or more other embodiments, the AR interface program 110A, 110B, 110C may be partially hosted on client computing device 102, server 112, and on augmented reality device 118 so that functionality may be separated among the devices.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and an AR interface program 110A and communicate with the server 112, augmented reality device 118, and IoT device 120 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 3, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running an AR interface program 110B and a database 116 and communicating with the client computing device 102, augmented reality device 118, and IoT device 120 via the communication network 114, in accordance with embodiments of the invention. As will be discussed with reference to FIG. 3, the server computer 112 may include internal components 402b and external components 404b, respectively. The server 112 may also operate in a cloud computing service model, such as Software as a Service (SaaS), Platform as a Service (PaaS), or Infrastructure as a Service (IaaS), and may host cloud services of multiple cloud service providers. The server 112 may also be located in a cloud computing deployment model, such as a private cloud, community cloud, public cloud, or hybrid cloud.

According to at least one embodiment, augmented reality device 118 may be any device which allows a user to perceive an augmented reality environment that is enabled to host and run an AR interface program 110C. The augmented reality device 118 may be any device equipped with a display that can render a virtual environment with virtual objects therein, and hardware or software that enables the device to track location and motion of the virtual objects relative to the virtual environment and/or the physical world, as well as motion of the user. Users may wear or utilize augmented reality device 118 while experiencing the augmented reality environment. The augmented reality device 118 may be a general-purpose device owned by users or may be customized or specialized for an individual augmented reality experience or class of augmented reality experiences. Augmented reality devices 118 may include such devices as virtual reality headsets with built-in microphones, augmented reality headsets with built-in microphones, smart glasses, smart contact lens, tablets, mobile phones, or any other augmented reality device 118 known in the art for creating and interacting with an augmented reality environment that is capable of connecting to the communication network 114, and transmitting and receiving data with the AR interface program 110A residing within client computing device 102 and the AR interface program 110B residing within server 112. As will be discussed with reference to FIG. 3, the augmented reality device 118 may include internal components 402c and external components 404c, respectively.

According to an example embodiment, the augmented reality device 118 may be implemented using known AR glasses which may include a processor, memory, an inward facing camera, an outward facing camera, one or more physical touch input mechanisms (e.g., controls) on one or both arms of the AR glasses, network capability (e.g., WiFi, Bluetooth), Global Positioning System (GPS) capability, a microphone, and motion sensors (e.g., accelerometer, gyroscope, magnetometer) mounted on or within the frame of the AR glasses. According to another embodiment, the augmented reality device 118 may be implemented using known smart contact lenses having similar capabilities as the AR glasses. In lieu of physical touch input by the user, a smart contact implementation may receive hand gestures or voice commands as input from the user. According to yet another embodiment, the augmented reality device 118 may be implemented with known heads-up-display capability of a smart windshield.

IoT device 120 may be any IoT-enabled smart device that is capable of connecting to the communication network 114 and transmitting and receiving data with the client computing device 102, the augmented reality device 118, and the server 112. For example, IoT device 120 may be a smartwatch, a smartphone, a smart TV, a smart thermostat, a smart speaker, a tablet computer, a laptop computer, a desktop computer, a wearable computing device, or any IoT device having a processor, network capability, and an available UI for control. Additionally, the IoT device 120 may include a memory, an outward facing camera, one or more physical touch input mechanisms (e.g., controls), GPS capability, a microphone, and motion sensors (e.g., accelerometer, gyroscope, magnetometer) mounted on or within the IoT device 120. According to at least one implementation, the networked computer environment 100 may include a plurality of IoT devices 120.

According to the present embodiment, the AR interface program 110A, 110B, 110C may be a program capable of visually segmenting a surrounding environment of a user within an AR view of the surrounding environment to create distinct segmented areas of the AR view, mapping one or more UIs of accessible IoT devices within the surrounding environment to respective distinct segmented areas of the AR view, controlling the accessible IoT devices via their mapped UIs within the AR view, changing a mapping or configuration of a mapped UI within the AR view, and learning segmentation and mapping patterns of the user. The AR based UI control and configuration method is explained in further detail below with respect to FIG. 2.

Figure 2:
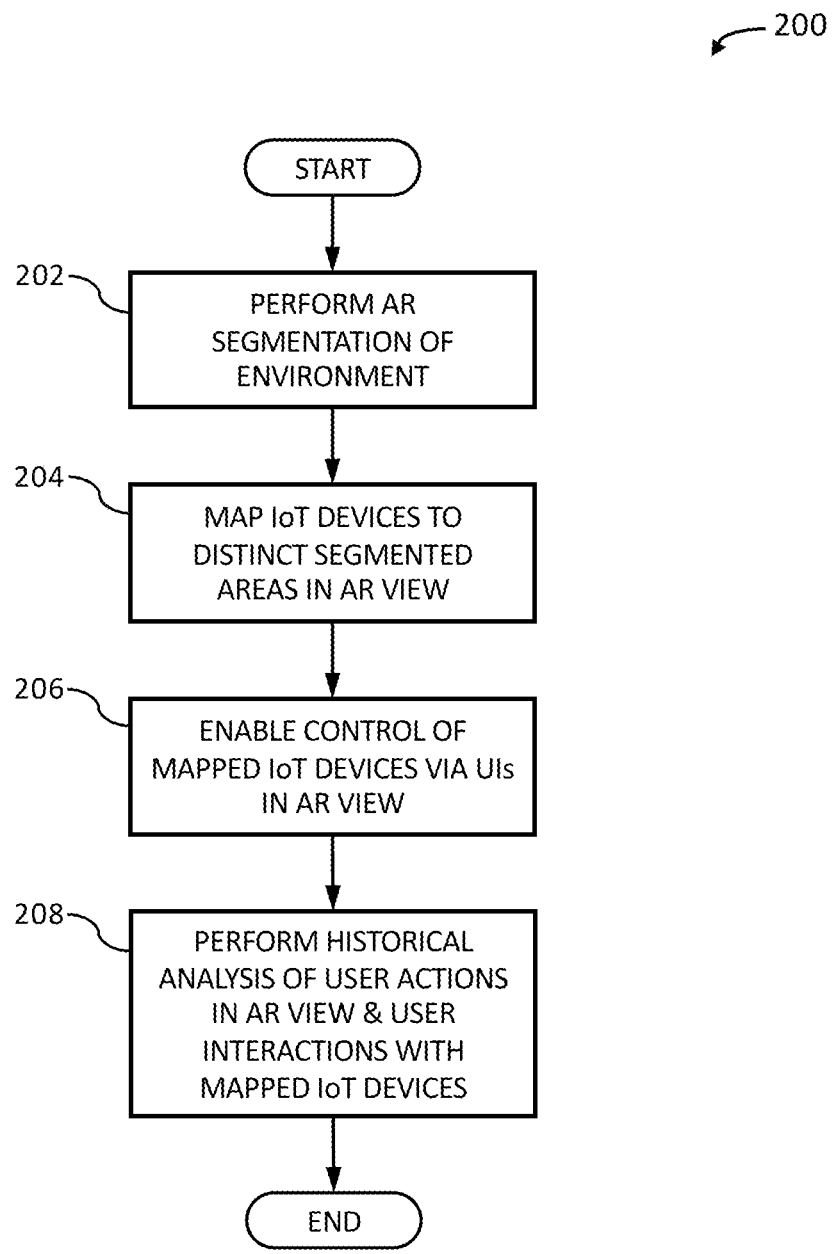
FIG. 2 illustrates an operational flowchart for controlling an IoT device in an AR based UI control and configuration process according to at least one embodiment.

Referring now to FIG. 2, an operational flowchart for controlling an IoT device in an AR based UI control and configuration process 200 is depicted according to at least one embodiment. At 202, the AR interface program 110A, 110B, 110C may enable a user to visually segment an AR view of their surrounding environment, created using an AR glasses implementation of augmented reality device 118, into distinct segmented areas within the AR view. For example, the distinct segmented areas may be displayed within the AR view as delineated vertical spaces, delineated horizontal spaces, delineated boxes, or any other configuration of delineated areas within the AR view. The AR interface program 110A, 110B, 110C may enter and exit an environment segmentation mode as a result of a control action of the user received by the AR glasses. For example, the control action may include touch input of the user entered via physical touch input mechanisms (i.e., controls) on the AR glasses, an identified hand gesture of the user captured by an outward facing camera of the AR glasses, or a voice command of the user received by a microphone of the AR glasses. According to at least one embodiment, the distinct segmented areas within the AR view may be manually defined by the user through interaction with the physical touch input mechanisms as the user scans their environment with the AR glasses. For example, the user, viewing a first point within the AR view, may press a button on the AR glasses to mark the beginning of a first segmented area. The user may then move their eyes or head to view a second point within the AR view and press the button on the AR glasses to mark the end of the first segmented area. In this example, the first segmented area within the AR view may include the vertical or horizontal space, depending on how the user moved their eyes or head, between the first point and the second point within the AR view. The user may continue in this fashion to define multiple distinct segmented areas within the AR view.

According to as least one other embodiment, the AR interface program 110A, 110B, 110C may dynamically define distinct segmented areas within the AR view based on detected eye or head movement of the user as they visually scan the surrounding environment with the AR glasses. The user may perform some control action to enter the environment segmentation mode. The AR interface program 110A, 110B, 110C may then begin defining distinct segmented areas within the AR view based the starting and stopping of detected eye or head movements of the user. For example, the starting of an eye or head movement of the user may mark the beginning of a segmented area within the AR view and the stopping of the eye or head movement may mark the end of the segmented area within the AR view. The starting and stopping of a user's eye or head movement may be detected by an inward facing camera and/or motion sensors of the AR glasses and analyzed by the AR interface program 110A, 110B, 110C to identify a first point within the AR view and a second point within the AR view. In this example, the first segmented area within the AR view may include the vertical or horizontal space, depending on how the user moved their eyes or head, between the first point and the second point within the AR view. The user may continue in this fashion to define multiple distinct segmented areas within the AR view.

According to at least one further embodiment, the AR interface program 110A, 110B, 110C may dynamically define distinct segmented areas within the AR view based on hand gestures of the user which may drag and drop a rendered object within the AR view to a particular area/location within the AR view. The rendered object may be representative of an IoT device within the surrounding environment that, as a prerequisite, is paired to the AR glasses and accessible by the AR interface program 110A, 110B, 110C. The hand gestures of the user may be detected by an outward facing camera of the AR glasses and analyzed by the AR interface program 110A, 110B, 110C to identify the IoT device represented by the rendered object and its dropped location within the AR view. For example, within the AR view, the user may see three rendered objects, each one representative of a paired IoT device within the environment. The user may then perform some control action to enter the environment segmentation mode, point to one of the three rendered objects and drag it to the left side of the AR view, point to a next one of the three rendered objects and drag it to the center of the AR view, and point to a last of the three rendered objects and drag it to the right side of the AR view. In response, the AR interface program 110A, 110B, 110C may create a left distinct segmented area, a center distinct segmented area, and a right distinct segmented area within the AR view. Thus, the placement of a rendered object may cause the dynamic creation of a distinct segmented area. The AR interface program 110A, 110B, 110C may divide the AR view equally among the distinct segmented areas or according to predefined segmentation settings of a location or user specific profile stored within data storage device 106 or database 116.

According to yet one further embodiment, the AR interface program 110A, 110B, 110C may enable a user to segment a two-dimensional representation of an AR view of their surrounding environment using client computing device 102.

At 204, the AR interface program 110A, 110B, 110C may map IoT devices present within the environment to the distinct segmented areas of the AR view created at 202. As mentioned above, as a prerequisite to the segmenting and mapping capabilities of the AR interface program 110A, 110B, 110C, IoT devices present within the environment are paired to the AR glasses (e.g., via Bluetooth) and are thereby accessible by the AR interface program 110A, 110B, 110C. As such, the AR interface program 110A, 110B, 110C may display within the AR view a defined list of accessible IoT devices present within the environment. Defined lists of location specific accessible IoT devices may be maintained by the AR interface program 110A, 110B, 110C and stored within data storage device 106 or database 116. Moreover, within the AR view, the AR interface program 110A, 110B, 110C may, via the AR glasses, render a representative interactive virtual object for each paired IoT device. According to at least one embodiment, the AR interface program 110A, 110B, 110C may enable the user to map accessible IoT devices within the environment to distinct segmented areas of the AR view via hand gestures of the user which may drag and drop representative virtual objects for the accessible IoT devices to distinct segmented areas within the AR view. The hand gestures of the user may be detected by the outward facing camera of the AR glasses. According to at least one other embodiment, the AR interface program 110A, 110B, 110C may enable the user to map accessible IoT devices within the environment to distinct segmented areas of the AR view through interaction with the displayed list of accessible IoT devices via the physical touch input mechanisms on the AR glasses. For example, the user may utilize controls on the AR glasses to scroll through the list, select an accessible IoT device, and map it to a distinct segmented area.

At 206, the AR interface program 110A, 110B, 110C may enable the user to control mapped IoT devices from within the AR view. According to at least one embodiment, upon mapping an accessible IoT device (e.g., IoT device 120) to a distinct segmented area of the AR view, the AR glasses may serve as an external display for the mapped IoT device and the AR interface program 110A, 110B, 110C may display a UI for the mapped IoT device within its respective distinct segmented area of the AR view. The displayed UI may present the user with a list of interactive controls for the mapped IoT device that have been programmatically enabled using API calls by the AR interface program 110A, 110B, 110C to the mapped IoT device. The list of interactive controls may include a subset of configurable features of the mapped IoT device which are accessible from within the AR view. According to at least one embodiment, the user may utilize the physical touch input mechanisms on the AR glasses to interact with one or more of the enabled controls within the AR view and control functionality of the mapped IoT device. According to at least one other embodiment, the user may utilize hand gestures to interact with one or more of the enabled controls within the AR view and control functionality of the mapped IoT device. The hand gestures of the user may be detected by the outward facing camera of the AR glasses.

Additionally, at 206, the AR interface program 110A, 110B, 110C may, within the AR view, change a mapping, a configuration, or available controls of a displayed UI for a mapped IoT device (e.g., IoT device 120). According to at least one embodiment, a change in the mapping, configuration, or available controls of a displayed UI may be based on a change in the position or orientation of the mapped IoT device relative to the user or to other mapped IoT devices. The change in position or orientation of the mapped IoT device may be a control action input to the AR interface program 110A, 110B, 110C. For example, the user may perform some physical mobility of the mapped IoT device (e.g., a smartphone) such as a rotation of the mapped IoT device from a vertical orientation to a horizontal orientation. The AR interface program 110A, 110B, 110C may detect the change in orientation via the outward facing camera of the AR glasses or via motion sensors of the mapped IoT device. In response to the change to the horizontal orientation, the AR interface program 110A, 110B, 110C may change, within the AR view, the configuration of the displayed UI for the mapped IoT device from a portrait mode to a landscape mode. The AR interface program 110A, 110B, 110C may also change the available controls of the displayed UI from portrait mode controls to landscape mode controls. As another example, the user may perform some physical mobility of the mapped IoT device such as changing its position within the environment relative to other mapped IoT devices. In response to the change of position, the AR interface program 110A, 110B, 110C may change, within the AR view, the mapping (i.e., distinct segmented area) of the mapped IoT device, as well as the mappings of other mapped IoT devices, to reflect their current positions relative to each other.

According to at least one other embodiment, a change in the mapping, configuration, or available controls of a displayed UI may be based on user input (e.g., control actions) captured by the AR glasses such as hand gestures of the user (e.g., wrist movements, drag and drop of rendered objects within AR view). For example, the user may drag and drop the representative interactive virtual object for the mapped IoT device to a different distinct segmented area of the AR view thereby changing its mapping within the AR view. According to at least one further embodiment, a change in the mapping, configuration, or available controls of a displayed UI may be based on physical touch input of the user to the AR glasses (e.g., the user performing actions via controls mounted on the frame of the AR glasses).

Furthermore, while performing a hand gesture or physical mobility of the mapped IoT device, the AR interface program 110A, 110B, 110C may display, within the AR view, a thumbnail for navigation direction guidance. Alternatively, the AR interface program 110A, 110B, 110C may overlay the thumbnail on a screen of the mapped IoT device. Moreover, based on available configurations (e.g., portrait/landscape configurations) of the UI for the mapped IoT device, the AR interface program 110A, 110B, 110C may, via the thumbnail, depict a preview of changed mapping or configuration of the UI within the AR view resulting from continued performance of the hand gesture or physical mobility of the mapped IoT device. Information conveyed by the thumbnail may allow the user to quickly change the physical mobility or relative position of the mapped IoT device in order to attain display of the previewed UI mapping or configuration within the AR view.

At 208, the AR interface program 110A, 110B, 110C may perform historical analysis of user actions within the AR view and user interactions with mapped IoT devices (e.g., IoT device 120). According to at least one embodiment, information relating to the user's interactions with mapped IoT devices and the user's interactions with the AR glasses (e.g., physical mobility of mapped IoT devices, usage frequencies, location, hand gestures), information relating to the user's actions within the AR view (e.g., segmentation and mapping actions/preferences in different contextual settings), and information of mapped IoT devices (e.g., mapping histories, usage frequencies) may be gathered by the AR interface program 110A, 110B, 110C for historical analysis. The AR interface program 110A, 110B, 110C may apply AI-enabled methods of historical analysis (e.g., machine learning) to the gathered information to learn/derive patterns of physical mobility for mapped IoT devices, patterns of mapped IoT device usage in different contextual settings (e.g., patterns of mapped IoT device usage in home and work locations), mapping histories of paired IoT devices, mapping histories of most interacted with paired IoT devices, commonly implemented segmentation schemes for different contextual settings, heat maps indicative of concentrations of mapped IoT device user interactions (e.g., a heat map showing the user's most and least interacted with mapped IoT devices), and heat maps indicative of frequencies of distinct segmented area mappings to paired IoT devices (e.g., a heat map showing most and least mapped to segmented areas). The AR interface program 110A, 110B, 110C may determine and/or recommend future UI mappings, for paired IoT devices, within an AR view based on the information learned/derived through historical analysis. Furthermore, the information learned/derived through historical analysis may be stored within location or user specific profiles stored within data storage device 106 or database 116.

It may be appreciated that FIG. 2 provides only an illustration of one implementation and do not imply any limitations with regard to how different embodiments may be implemented. Many modifications to the depicted environments may be made based on design and implementation requirements.

Figure 3:
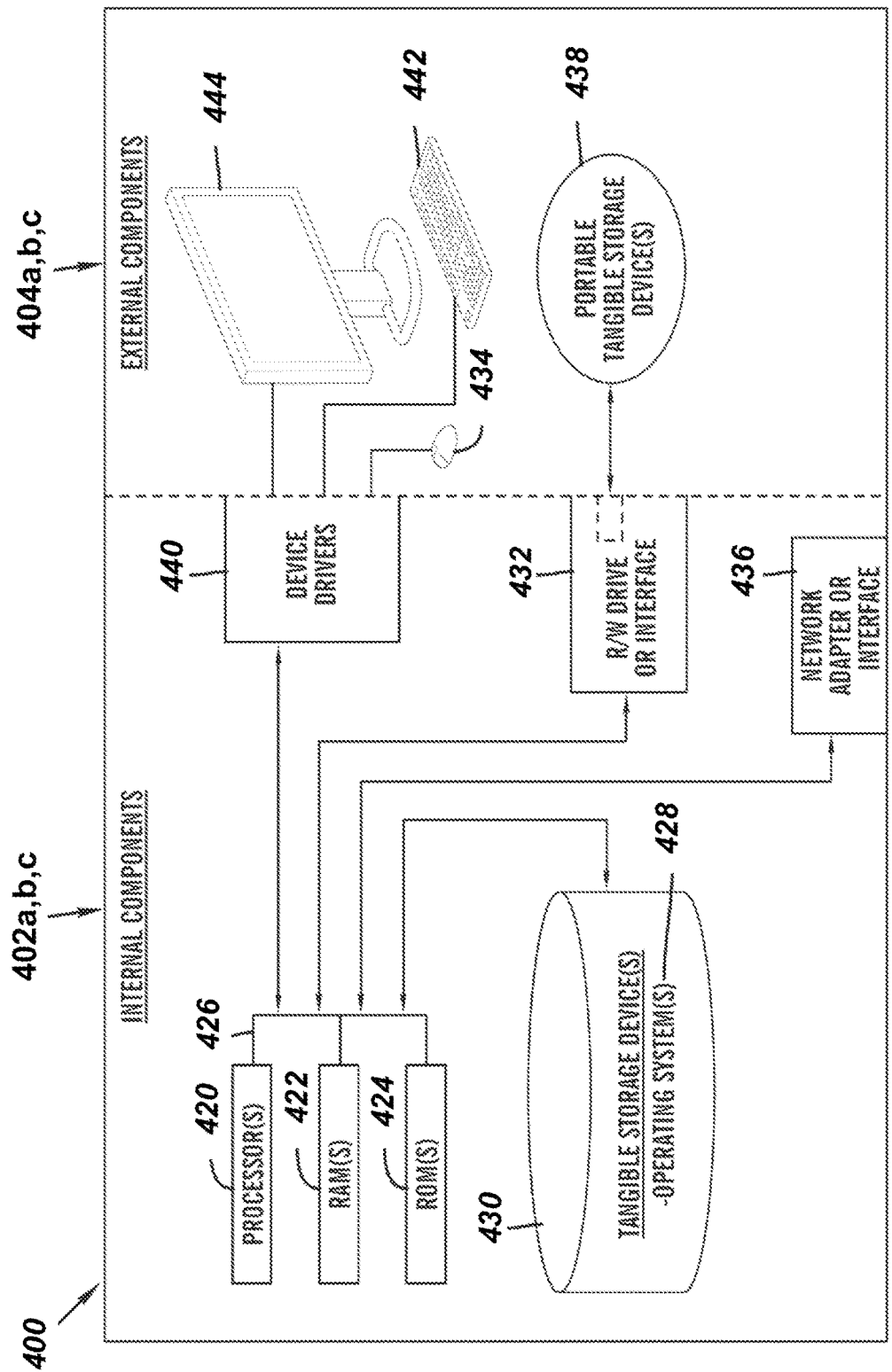
FIG. 3 is a functional block diagram of internal and external components of computers and servers depicted in FIG. 1 according to at least one embodiment.

FIG. 3 is a block diagram 400 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, IoT devices and distributed cloud computing environments that include any of the above systems or devices.

The client computing device 102, the server 112, and the augmented reality device 118 may include respective sets of internal components 402a,b,c and external components 404a,b,c illustrated in FIG. 3. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the AR interface program 110A in the client computing device 102, the AR interface program 110B in the server 112, and the AR interface program 110C in the augmented reality device 118 are stored on one or more of the respective computer-readable tangible storage devices 430 for execution by one or more of the respective processors 420 via one or more of the respective RAMs 422 (which typically include cache memory). In the embodiment illustrated in FIG. 3, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402a,b,c also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the AR interface program 110A, 110B, 110C can be stored on one or more of the respective portable computer-readable tangible storage devices 438, read via the respective R/W drive or interface 432, and loaded into the respective hard drive 430.

Each set of internal components 402a,b,c also includes network adapters or interfaces 436 such as a TCP/IP adapter cards, wireless Wi-Fi interface cards, or 3G or 4G wireless interface cards or other wired or wireless communication links. The software program 108 and the AR interface program 110A in the client computing device 102, the AR interface program 110B in the server 112, and the AR interface program 110C in the augmented reality device 118 can be downloaded to the client computing device 102, the server 112, and the augmented reality device 118 from an external computer via a network (for example, the Internet, a local area network or other, wide area network) and respective network adapters or interfaces 436. From the network adapters or interfaces 436, the software program 108 and the AR interface program 110A in the client computing device 102, the AR interface program 110B in the server 112, and the AR interface program 110C in the augmented reality device 118 are loaded into the respective hard drive 430. The network may comprise copper wires, optical fibers, wireless transmission, routers, firewalls, switches, gateway computers and/or edge servers.

Each of the sets of external components 404a,b,c can include a computer display monitor 444, a keyboard 442, and a computer mouse 434. External components 404a,b,c can also include touch screens, virtual keyboards, touch pads, pointing devices, and other human interface devices. Each of the sets of internal components 402a,b,c also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
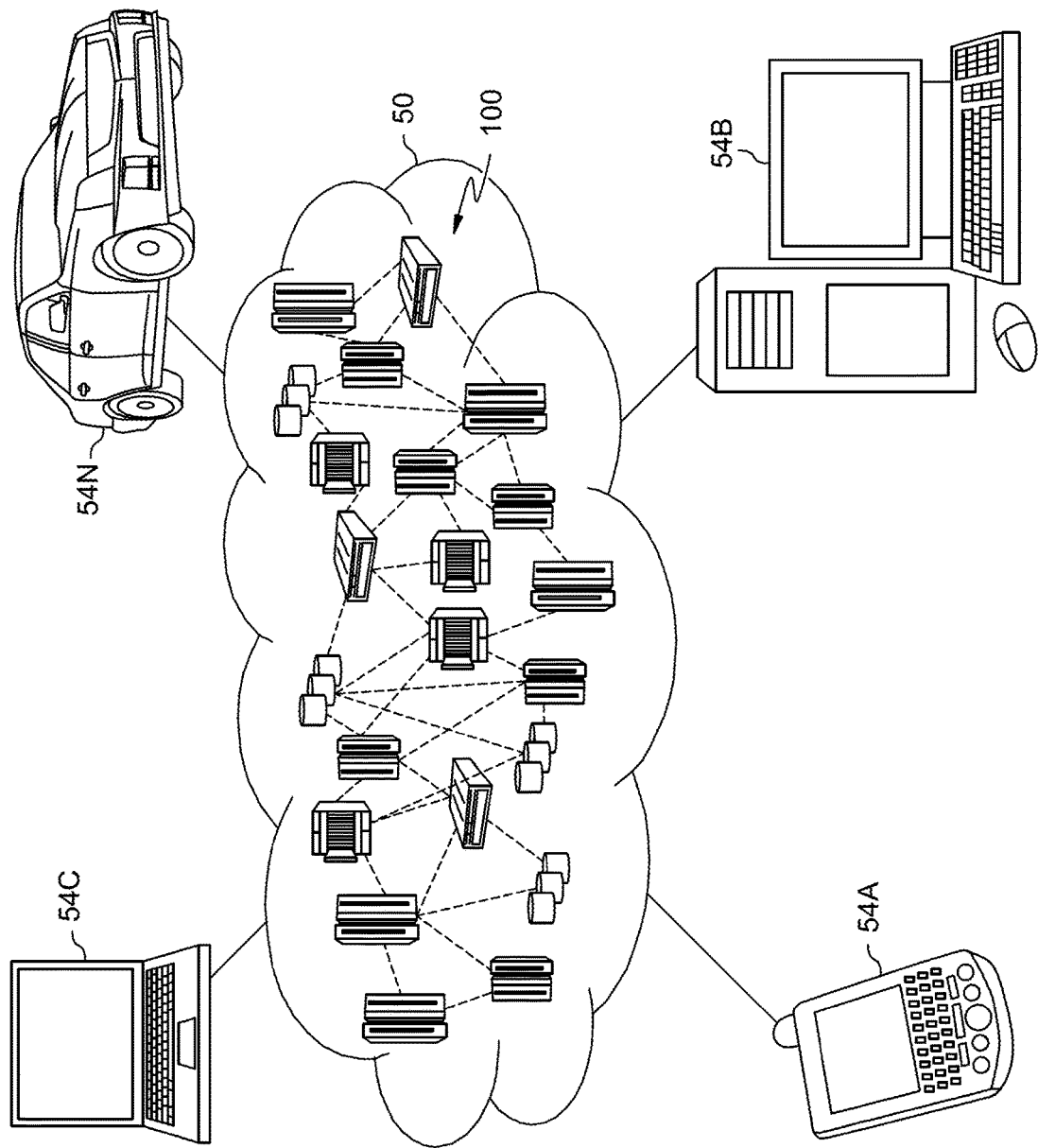
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
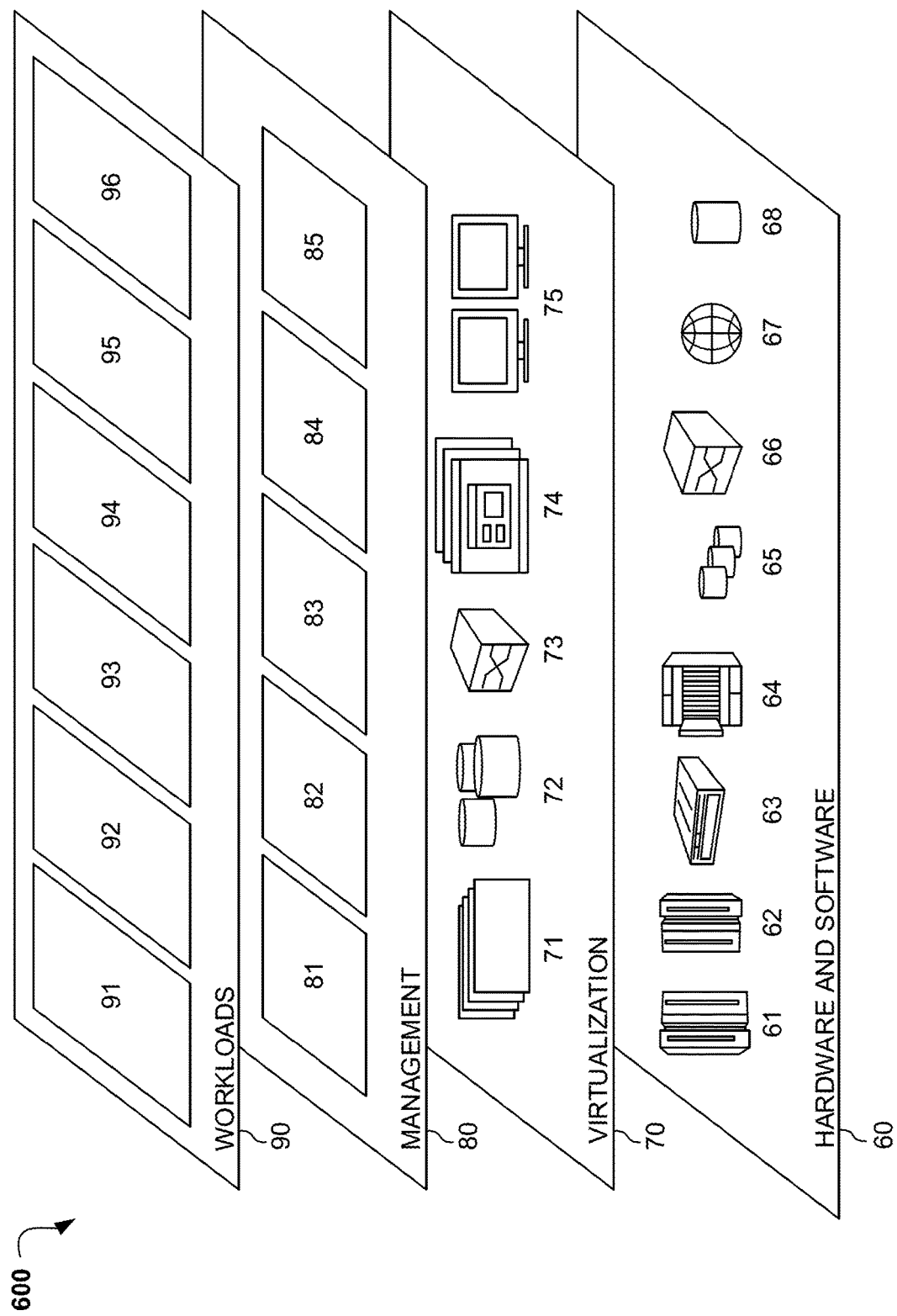
FIG. 5 depicts abstraction model layers according to an embodiment of the present invention.

Referring now to FIG. 5, a set of functional abstraction layers 600 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and AR interfacing 96. AR interfacing 96 may relate to control and configuration of IoT device UIs in an augmented reality view.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method for computing device control, the method comprising:
    segmenting, by an augmented reality (AR) device, an AR view of an environment of a user into distinct segmented areas of the AR view;
    mapping a computing device within the environment to a distinct segmented area of the AR view, wherein the mapping results in a user interface (UI) of the computing device being displayed within the distinct segmented area of the AR view, and wherein the computing device is paired to the AR device prior to the mapping, and wherein pairing the computing device to the AR device results in a representative interactive virtual object for the computing device being rendered by the AR device within the AR view;
    controlling the computing device via the UI of the computing device displayed within the distinct segmented area of the AR view; and
    changing a mapping of the computing device within the AR view based on a change in a position or orientation of the computing device, wherein a thumbnail for navigation direction guidance is displayed within the AR view during the change in the position or orientation of the computing device.

2. The method of claim 1, further comprising:
    changing at least one of a configuration or available controls of the UI of the computing device within the AR view based on a change in a position or orientation of the computing device.

3. The method of claim 1, further comprising:
    applying artificial intelligence (AR) methods of historical analysis of actions of the user within the AR view and interactions of the user with the computing device to derive patterns of user actions within the AR view; and
    recommending future mappings of computing devices based on the derived patterns.

4. The method of claim 1, wherein the mapping comprises the user dragging and dropping the representative interactive virtual object for the computing device to the distinct segmented area of the AR view.

5. The method of claim 1, wherein the segmenting is performed dynamically based on detected eye or head movement of the user as the user visually scans the environment with the AR device.

6. The method of claim 1, wherein the computing device comprises an Internet-of-Things computing device.

7. A computer system, the computer system comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
    segmenting, by an augmented reality (AR) device, an AR view of an environment of a user into distinct segmented areas of the AR view;
    mapping a computing device within the environment to a distinct segmented area of the AR view, wherein the mapping results in a user interface (UI) of the computing device being displayed within the distinct segmented area of the AR view, and wherein the computing device is paired to the AR device prior to the mapping, and wherein pairing the computing device to the AR device results in a representative interactive virtual object for the computing device being rendered by the AR device within the AR view;
    controlling the computing device via the UI of the computing device displayed within the distinct segmented area of the AR view; and
    changing a mapping of the computing device within the AR view based on a change in a position or orientation of the computing device, wherein a thumbnail for navigation direction guidance is displayed within the AR view during the change in the position or orientation of the computing device.

8. The computer system of claim 7, further comprising:
    changing at least one of a configuration or available controls of the UI of the computing device within the AR view based on a change in a position or orientation of the computing device.

9. The computer system of claim 7, further comprising:
    applying artificial intelligence (AR) methods of historical analysis of actions of the user within the AR view and interactions of the user with the computing device to derive patterns of user actions within the AR view; and
    recommending future mappings of computing devices based on the derived patterns.

10. The computer system of claim 7, wherein the mapping comprises the user dragging and dropping the representative interactive virtual object for the computing device to the distinct segmented area of the AR view.

11. The computer system of claim 7, wherein the segmenting is performed dynamically based on detected eye or head movement of the user as the user visually scans the environment with the AR device.

12. The computer system of claim 7, wherein the computing device comprises an Internet-of-Things computing device.

13. A computer program product, the computer program product comprising:
one or more computer-readable tangible storage medium and program instructions stored on at least one of the one or more tangible storage medium, the program instructions executable by a processor capable of performing a method, the method comprising:
segmenting, by an augmented reality (AR) device, an AR view of an environment of a user into distinct segmented areas of the AR view;
mapping a computing device within the environment to a distinct segmented area of the AR view, wherein the mapping results in a user interface (UI) of the computing device being displayed within the distinct segmented area of the AR view, and wherein the computing device is paired to the AR device prior to the mapping, and wherein pairing the computing device to the AR device results in a representative interactive virtual object for the computing device being rendered by the AR device within the AR view;
controlling the computing device via the UI of the computing device displayed within the distinct segmented area of the AR view; and
changing a mapping of the computing device within the AR view based on a change in a position or orientation of the computing device, wherein a thumbnail for navigation direction guidance is displayed within the AR view during the change in the position or orientation of the computing device.

14. The computer program product of claim 13, further comprising:
changing at least one of a configuration or available controls of the UI of the computing device within the AR view based on a change in a position or orientation of the computing device.

15. The computer program product of claim 13, further comprising:
applying artificial intelligence (AR) methods of historical analysis of actions of the user within the AR view and interactions of the user with the computing device to derive patterns of user actions within the AR view; and
recommending future mappings of computing devices based on the derived patterns.

16. The computer program product of claim 13, wherein the mapping comprises the user dragging and dropping the representative interactive virtual object for the computing device to the distinct segmented area of the AR view.

17. The computer program product of claim 13, wherein the segmenting is performed dynamically based on detected eye or head movement of the user as the user visually scans the environment with the AR device.

* * * * *